United States Patent [19]

Edgar

[11] Patent Number: 5,519,510
[45] Date of Patent: May 21, 1996

[54] ELECTRONIC FILM DEVELOPMENT

[75] Inventor: Albert D. Edgar, Austin, Tex.

[73] Assignee: International Business Machines Corporation, Armonk, N.Y.

[21] Appl. No.: 257,227

[22] Filed: Jun. 8, 1994

Related U.S. Application Data

[63] Continuation of Ser. No. 916,246, Jul. 17, 1992, abandoned.

[51] Int. Cl.$^6$ ........................................ G03F 3/10
[52] U.S. Cl. .......................................... 358/471; 358/474
[58] Field of Search ................................. 358/474, 475, 358/487, 75, 80, 400, 475, 474, 487, 498, 471, 526; 355/24; 356/493, 444

[56] References Cited

U.S. PATENT DOCUMENTS

| | | | |
|---|---|---|---|
| 3,501,235 | 3/1970 | Anton et al. | 355/9 |
| 4,554,460 | 11/1985 | Klein | 250/578 |
| 4,571,636 | 2/1986 | Itoh | 358/285 |
| 4,635,108 | 1/1987 | Reeber et al. | 358/76 |
| 4,837,635 | 1/1988 | Santos | 358/287 |
| 4,851,925 | 2/1989 | Yamasaki et al. | 358/296 |
| 5,041,995 | 8/1991 | Tokuda | 364/525 |
| 5,084,758 | 1/1992 | Danzaka et al. | 358/296 |
| 5,101,286 | 3/1992 | Patton | 358/487 |
| 5,136,665 | 8/1992 | Inoue | 358/408 |

FOREIGN PATENT DOCUMENTS

| | | |
|---|---|---|
| 0278238 | 8/1988 | European Pat. Off. . |
| 0410376 | 1/1991 | European Pat. Off. . |
| 3035966 | 4/1981 | Germany . |

OTHER PUBLICATIONS

Mastering Aldus Photostyler by Paul Brainerd Copyright Apr. 1992 Publisher Bantam Book.
IBM Technical Disclosure Bulletin, vol. 29, No. 7, Dec., 1986, "Photographic Image Computer Analyzer", pp. 2823–2824.

Primary Examiner—Sandra L. O'Shea
Assistant Examiner—John Ning
Attorney, Agent, or Firm—Mark S. Walker; Keith Stephens

[57] ABSTRACT

A system and method for electronically developing an image recorded on film by applying a developer to and then scanning the film during the development at a number of spaced timed intervals. Images are captured during each of the spaced scans and are stored as digital representations of that scan. The stored digital representations are combined on a pixel-by-pixel basis to produce an output image that differs from any one of the stored representations. This combination of digital images allows for optimal image development without actually forming or storing the image on the film itself.

27 Claims, 9 Drawing Sheets

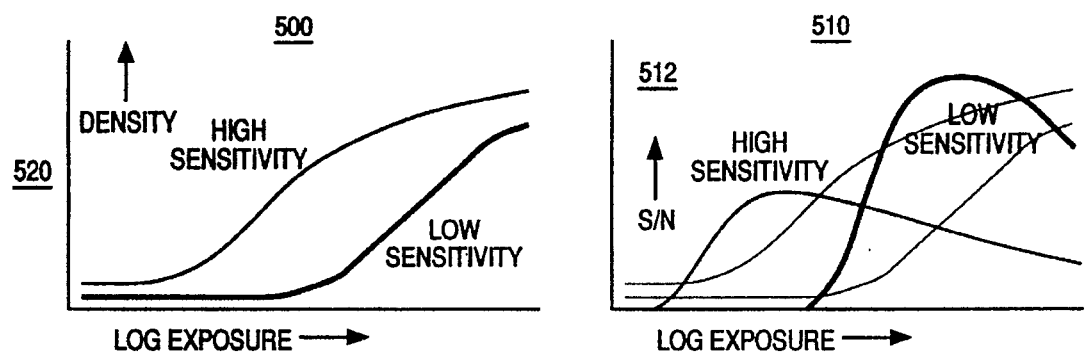
FIG. 5A(1)
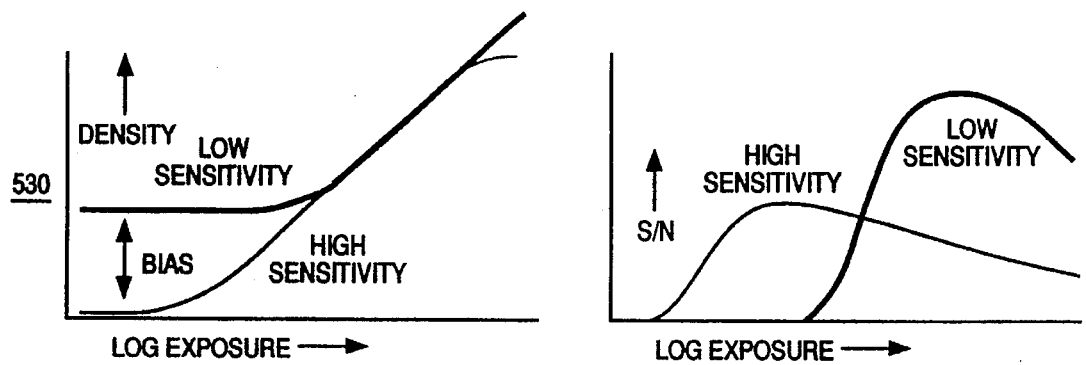
FIG. 5A(2)
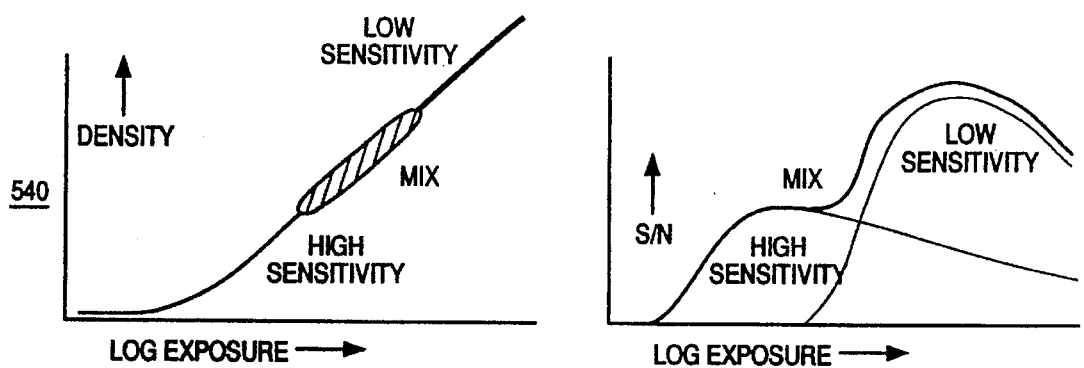
FIG. 5A(3)

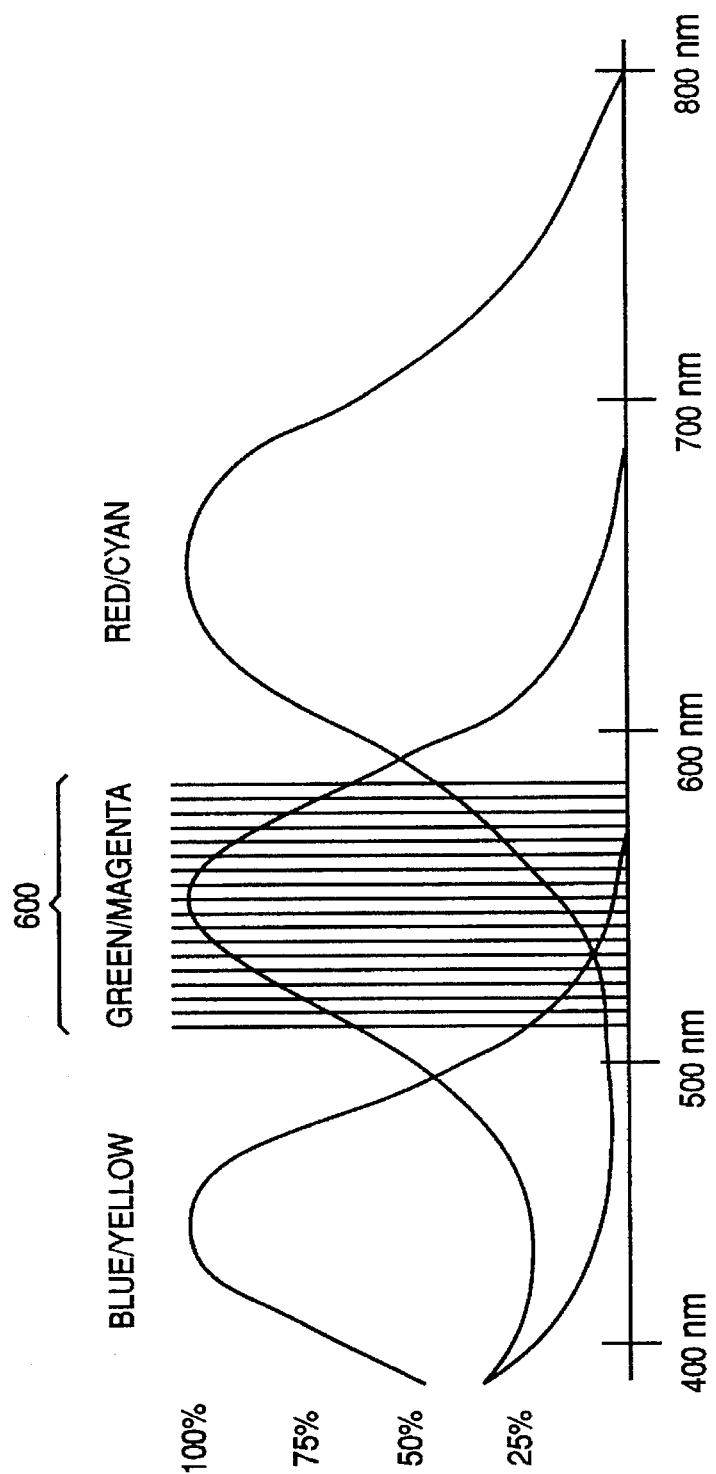

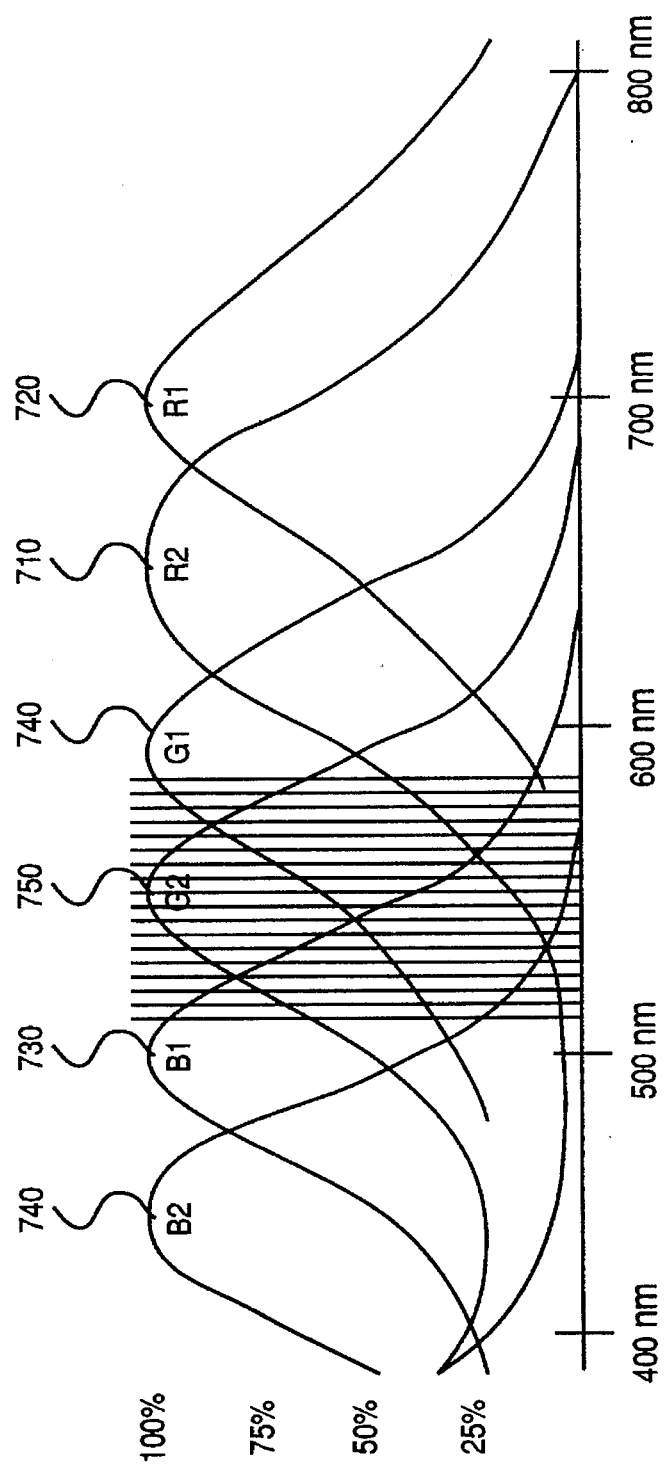

ELECTRONIC FILM DEVELOPMENT

This is a continuation of application Ser. No. 07/916,246 filed Jul. 17, 1992, abandoned.

CROSS-REFERENCE TO RELATED APPLICATIONS

This application is related to application Ser. No. 07/916,244, entitled "Duplex Film Scanning", filed Jul. 17, 1992.

FIELD OF THE INVENTION

This invention generally relates to improvements in image processing and more particularly to enhancing film processing by applying electronic imaging technology.

BACKGROUND OF THE INVENTION

Image enhancement has been the subject of a large body of patent art. For example, U.S. Pat. No. 4,606,625 discloses a system for colorizing black and white film in which interpolative techniques are used to reduce the number of frames which have to be individually colorized.

Another example of a prior art image enhancement is U.S. Pat. No. 4,907,075 which discloses a method for selecting a limited number of presentation colors from a larger palette for a selected image. A three dimensional color histogram of an image is generated and a first color is selected based upon the color occurring most frequently in the image. Subsequent presentation colors are selected by choosing one at a time those colors having the highest weighted frequency of occurrence wherein the weighting is such that colors closest to the previously selected color are weighted very little while colors furthest away from the selected color are weighted the most.

Still another example of an image enhancement system is found in U.S. Pat. No. 4,984,072 which discloses a system and method for color enhancing an image or a series of images such as a motion picture by digitally capturing the images, interactively defining masks corresponding to objects in the images having similar hues, creating regions from these masks, and for each region, defining a color transfer function for converting image gray-scale information to unique values of hue, luminance, and saturation. The gray scale values within each region are then processed through that region's color transfer function, and the resulting colors applied to the image and stored for later retrieval and display.

Still another example of an imaging system is U.S. Pat. No. 5,041,992 which discloses a system and method for interactive design of user manipulable graphic elements. The system allows a user to create and manipulate graphic elements that can be subsequently employed to create a program.

U.S. Pat. No. 5,041,995 discloses a method for controlling the exposure used to print a developed film negative. The patent pertains to inspection of the negative film medium after the film has been processed.

U.S. Pat. No. 4,554,460 discloses a photodetector automatic adaptive sensitivity system for controlling the exposure of a scanned image during the electronic scanning of the object.

None of these prior art patents or any other prior art that applicant is aware of disclose a method or system for enhancing film development through the application of electronic imaging technology.

SUMMARY OF THE INVENTION

Accordingly, it is a primary objective of the present invention to enhance film development through the application of electronic imaging technology.

These and other objectives of the present invention are accomplished by the operation of a process in the memory of a processor that scans film during the development of the film. Several scans during the development process are individually captured as images. Then, each individual image is separately optimized for highlights and shadows. The resulting images are reassembled to produce a superior image. Only the developer bath is necessary since all subsequent processing of the film is performed electronically.

BRIEF DESCRIPTION OF THE DRAWINGS

FIG. 5A illustrates film stitching in accordance with the subject invention;

FIG. 6 is a graph of three basic film dye colors and the range seen by a particular receptor in accordance with the subject invention;

FIG. 7 is a graph of a layered film and a plot of the six film dye colors and the range seen by a particular receptor in accordance with the subject invention;

DETAILED DESCRIPTION OF THE INVENTION

Figure 1:
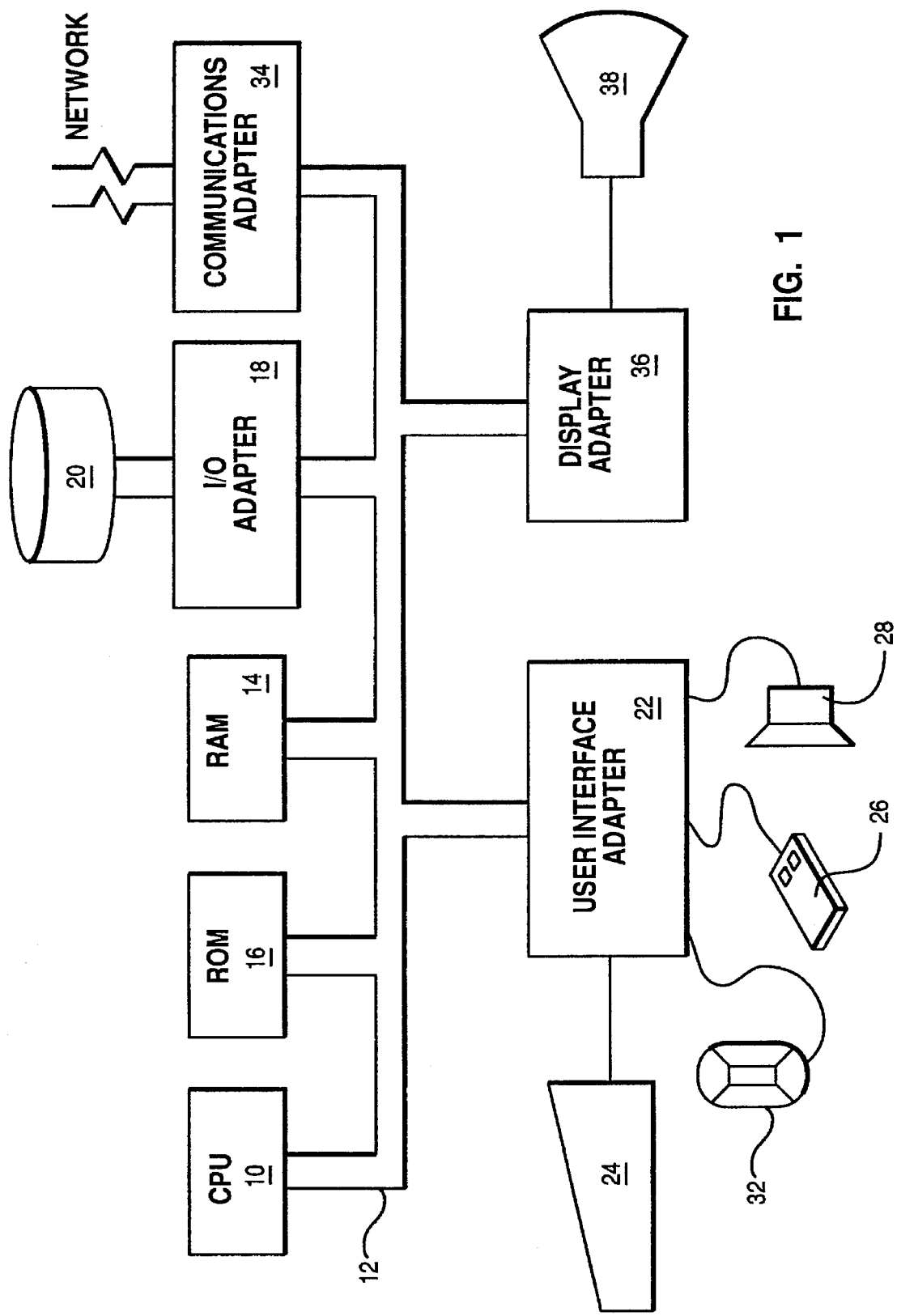
FIG. 1 is a block diagram of a personal computer system in accordance with the subject invention.

The invention is preferably practiced in the context of an operating system resident on an IBM RISC SYSTEM/6000 computer available from IBM Corporation. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon the AIX operating system and the computer software making up this invention which is included as a toolkit.

POLYSPECTRALLY ENCODED FILM

Polyspectrally encoded film refers to a universal, multispeed color film. The film is used as a recording medium to be scanned and computer processed in accordance with the subject invention. The film is not intended to be viewed or printed directly; although, such capability is not prohibited by the invention. Unlike conventional color film that typically has over six layers but only three standard dye colors, this film assigns six dye colors among the layers. The processed film is scanned with a separate color for each dye. Although there may be crosstalk between the six dye colors, the scan gives each pixel an equation of six variables. Solving this matrix separates the six dye images. The algorithm then selects, for each pixel, the dye image or blend giving the most grainless representation, which enables assembly of an image superior to current technology films over a wide range of effective film speeds.

Conventional photography uses silver halide crystals to "see" light. A single photon can excite a sensitizing dye molecule that in turn generates a single atom of free silver within a crystal. This silver atom returns to the lattice in about a second unless another photon creates another free silver atom, and the two silver atoms attract each other to form a stable nucleus that grows as more photons create more silver atoms. At typically less that ten atoms, the nucleus becomes a gate through which developer can reduce all the bound silver in that one crystal. The film maker chooses the size of the crystals, or grains. If they are large, fewer photons are required per unit area to provide each grain the exposure necessary for proper development. However, if the grains are small, then the image will be "fine-grained", but more light is necessary per unit area to give each of the tiny grains enough photons for development. This is a tradeoff that photographers have struggled with until the subject invention.

Only about one percent (1%) of the photons actually induce silver atoms, much of the rest are simply passed through the silver halide film. Thus, the film maker has the option of painting several layers of film together, each sensitive as though it were the only layer. However, the emulsion is naturally milky white, and thus light diffuses within the film. A high speed film might use a thick emulsion to maximize the chance of trapping each photon. A fine grained film might use a thin emulsion darkened with anti-halation dye to prevent light diffusion and maximize sharpness at the expense of speed. Using modern thin film emulsions, seven or more layers can be placed before halation is a problem.

If all grains were the same size, then they would turn black at the same exposure resulting in a high contrast image. By mixing different sized grains, the film maker can control contrast by letting some big grains develop with very little light and more fine grains develop with more light. The problem is, the exposure time necessary for the fine grains to develop over exposes the coarse grains, and looking through these coarse grains in the same emulsion damages what could have been fine grained highlights.

The chromogenic monochrome films on the market today sandwich three emulsions together that develop chromogenically to three colors in standard color developer. This film is identical to color film, except that the three levels have three speeds instead of three color sensitivities. In the darkroom, the photographer selects the high, medium or low speed emulsion by selecting a red, green or blue filter in the enlarger. In effect, three pictures are made simultaneously on three films, letting the printer select the optimal one. However, the selection is made only on the image as a whole. Thus, one cannot take the shadows from the high speed film and the white clouds from the low speed, fine grained film. Therefore, there is no quality advantage over using the right conventional film with the right exposure. The technology has two severe limitations. The first is that panchromatic paper must be used, which precludes the use of variable contrast paper and a bright safelight in the darkroom. The second is that the technique is not extendable to color film.

Most color films have far more than three layers. For example, there may be two magenta forming layers consisting respectively of large and small grains. The layer with large grains partially exhausts the couplers when completely exposed. Therefore, instead of leaving large sharp grains to mask the highlights as in monochrome film, the layer saturates into a more uniform neutral density by using up dye couplers in that layer. The fine grained highlights are still damaged as the saturation is not perfect, but less severely than in monochrome film. Color films in fact have lower granularity in highlights than shadows, as opposed to silver image films which always show an increase along with density.

DIGITAL IMAGE STITCHING

Before extending the technique to color, first consider a technique applicable to standard chromogenic film using computer technology. Using a scanner and computer processing, monochrome chromogenic film can produce a superior image to a conventional film by allowing a computer to "stitch" together the shadows from the high speed layer and the near grainless highlights from the low speed layers. Because the separation of low speed layers from high speed layers is nearly perfect, there is no damage of the highlights by large grains from the shadows. Also, the film itself can be improved if prints always come from the computer. Because each layer is only required to reproduce a narrow range of brightness, grains outside the narrow range can be eliminated from each layer to reduce the granularity and improve the sharpness of the resultant image for a normal exposure range per layer by thinning the emulsion.

Figure 4:
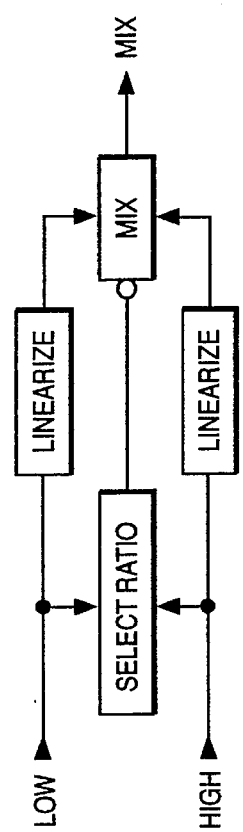
FIG. 4 is a block diagram of a stitching process in accordance with the subject invention.

FIG. 4 illustrates the "stitching" process diagrammatically. Each pixel is scanned to read the "high" sensitivity and "low" sensitivity layers, giving a high value and a low value for that pixel. Based on these two values for each pixel, a ratio is selected that picks the low value when the low value is strong, the more noisy high value when the low value is below a useable range, and a mix when the low value is weak but still useable. Both the high and low values are gamma corrected to linearize and align their density curves. The ratio selected drives a simple mixer that outputs the processed levels for the pixel. A more complex method would base the "select ratio" block on an average of high and low pixels over some small region proportional to grain size. This example uses two emulsion speeds, but the concept works equally well with three or more.

FIG. 5A is an illustration of film development in accordance with the subject invention. The left column 500 shows the density of pixels versus exposure, and the right column 510 shows the signal to noise (S/N) 512 or grain to contrast ratio versus exposure. In the raw scan data of the first row 520, the low sensitivity layer requires more exposure to respond, but gives a better signal to noise ratio.

In the middle row 530, linearization is applied to both the high and low data. Linearization, also called "gamma correction", can be performed with a lookup table that stores the inverse of the film characteristic. Linearization changes both the grain and the contrast in equal amounts, leaving the signal to noise ratio unchanged.

The bottom row 540 mixes the high and low curves. In the region where both high and low emulsions are responding, a blending of both images gives a signal to noise ratio superior to either individually. The best weighting ratio for each density is known from statistical mathematics to be, for the lower layer, the S/N of the low divided by the S/N of the sum of both. For the high layer, the S/N of the high is divided by the same sum.

POLYSPECTRALLY ENCODED COLOR FILM

The relevancy of this information would diminish if, as in the prior art, the multispeed technology excluded color. Now it will be extended to color. FIG. 6 is a graph of three basic film dye colors and the range seen by a particular receptor in accordance with the subject invention. The shaded area 600 marks the range of color visible by a particular receptor, such as the green sensitive layer in color paper. Note that the width of the dye absorptions and the width of the receptor response barely allow the three colors to be placed in the visible spectrum without too much crosstalk.

The color names are unimportant. They are based on an old paradigm that films can only modulate in three colors because that is all the human eye can see, and films are made to be seen. In fact, film can use a different color for each of the six or more layers in today's color film. The dyes in a film are picked from a selection that includes peaks at any visible wavelength.

FIG. 7 is a graph of a layered film and a plot of the absorption of dyes in each of the three layers, and the range seen by a particular receptor in accordance with the subject invention. FIG. 7 merges a typical cyan dye from transparencies 710, a typical cyan dye from negatives 720, and an intermediate yellow 730 and magenta 740 with standard yellow 740 and magenta 750 to total six colors. Now the film has twice the information that can be seen by the human eye. It is also not usable for printing because the overlap of the dyes has made it impossible for any sensitized layer in a paper to respond to just one of the dye layers free from crosstalk from adjacent dyes.

The film is optimal for a scanning operation. Six scans at different wavelengths provide six variables for each pixel. Even though there will be cross talk, these six variables can be solved by six equations for the six unknowns which are the densities of each dye level for a particular pixel. Six scans are made at different colors and the matrix is applied to separate the six dye records. For each of the three sensitivity colors, red, green and blue this example yields two dye records for the high and low sensitivity levels. The two dye records are mixed using the stitching method as disclosed above to produce an optimum image. By using this blend of photochemistry and computer science, a superior film based imaging technique is created.

Figure 8:
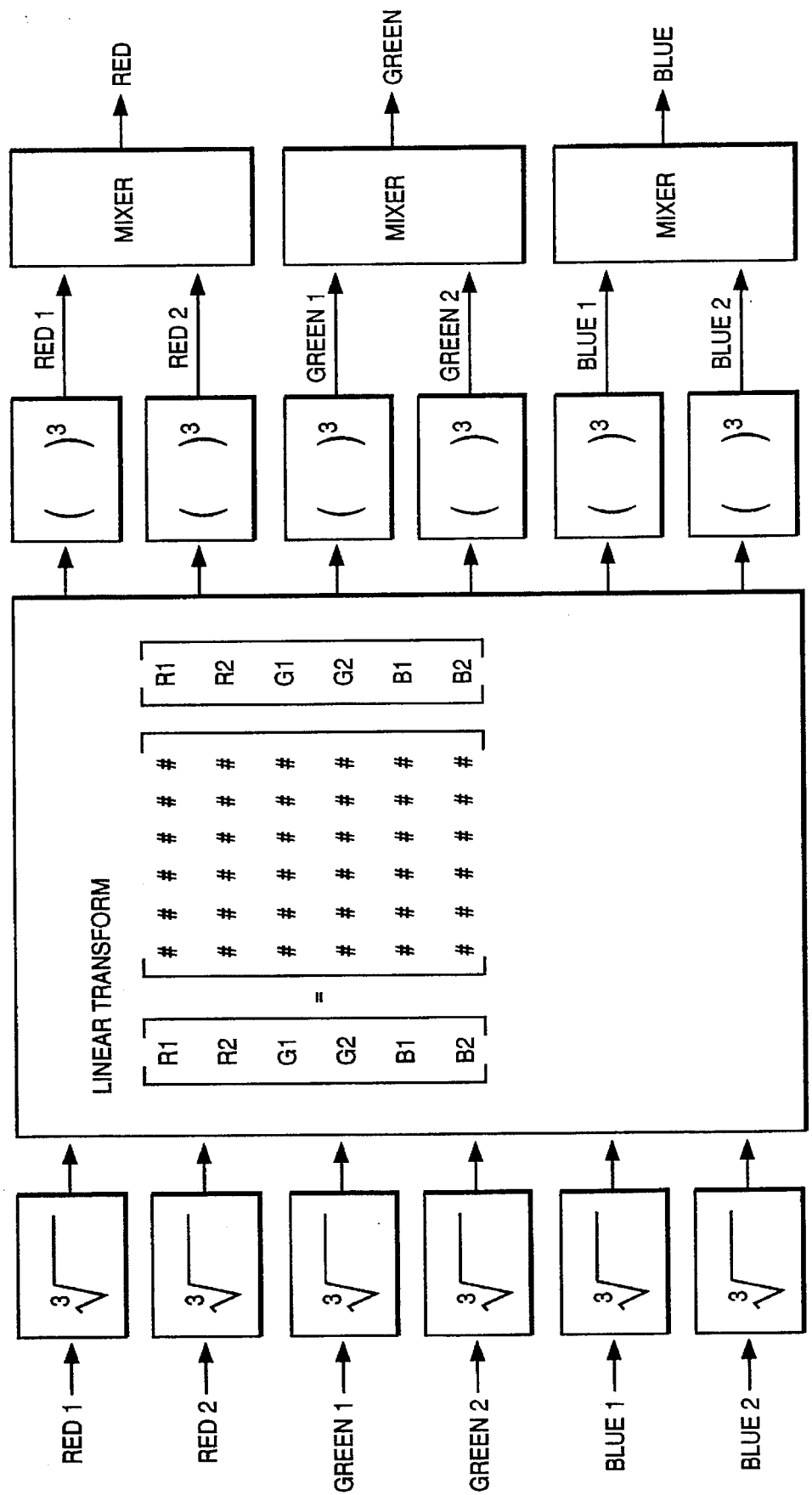
FIG. 8 is a block diagram of the image processing for film development that resolves each of the pixel values in accordance with the subject invention.

FIG. 8 is a block diagram of the image processing for film development that resolves each of the six dye densities for each pixel values in accordance with the subject invention. By operating in the cube root regression domain, applicant has found superior resolution from a simple linear regression. The method of this invention changes accepted conventions. The computer becomes, not an accessory to photography, but a core technology for the photographic process.

ELECTRONIC FILM DEVELOPMENT

Today, a photographer drops off her film at a processing lab and awaits the results. The processing lab sends the film to a darkroom for exposure to developer, fix and rinse. Then, the resulting negatives are individually loaded into an enlarger for creation of positive prints. The invention does away with the processing lab and substitutes a computer.

For years, photographers have been required to enter a darkroom and carefully monitor the time that negatives were exposed to the initial chemical mixture. A rare technique was to desensitize the film first using a special dye. Then, a safety light could be illuminated and the photographer can watch the images come alive in the developer. Each precious image would get just the right time, some were snatched quickly, while others had to be nursed for long periods. However, there is no optimal development time. White clouds may show their lacy details best after only three minutes, but the darkest shadows may not reveal their secrets for thirty minutes or more, with the resultant destruction of the white clouds. Photographers dreamed of the impossible chemical feat of combining the image of the clouds at three minutes with the shadows after thirty minutes. The subject invention turns what could only be a dream in the chemical development processing into an electronic reality.

The invention employs image capture of a developing film multiple times during the development process. The scans use a color that does not expose the film, normally infrared. The timings of the scans give a normal, an extra long and an extra short development.

Figure 2A:
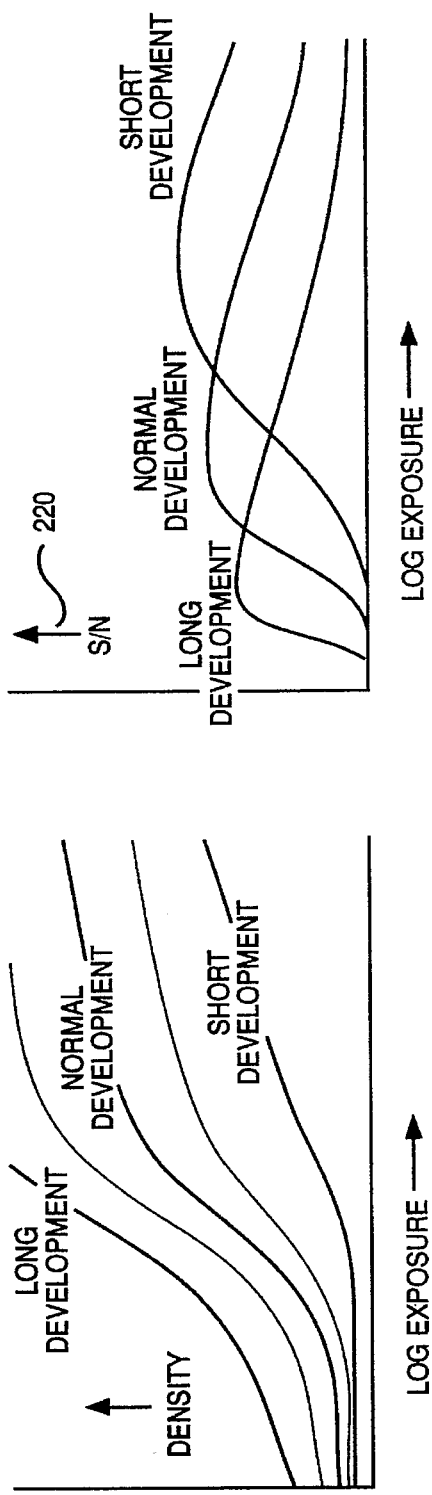
FIG. 2a illustrates the relationship of density/signal to noise ratio and exposure time in film in accordance with the subject invention.

FIG. 2a illustrates the results on the left with density, and on the right with signal to noise versus exposure. In photography, the signal gain is "contrast" and the noise is "grain." Contrast alone is irrelevant to a digital system because it can be easily changed for aesthetics, so the signal to noise ratios (S/N) 220 and 222 are key. FIG. 2a illustrates that overdevelopment pulls more detail from shadows but "blocks up" or "ruins" the highlights, while underdevelopment gives smooth highlights while shadow detail remains latent. It is clear that if one could develop the film all three ways, then an image could be created with the best characteristics of each development time.

Figure 2B:
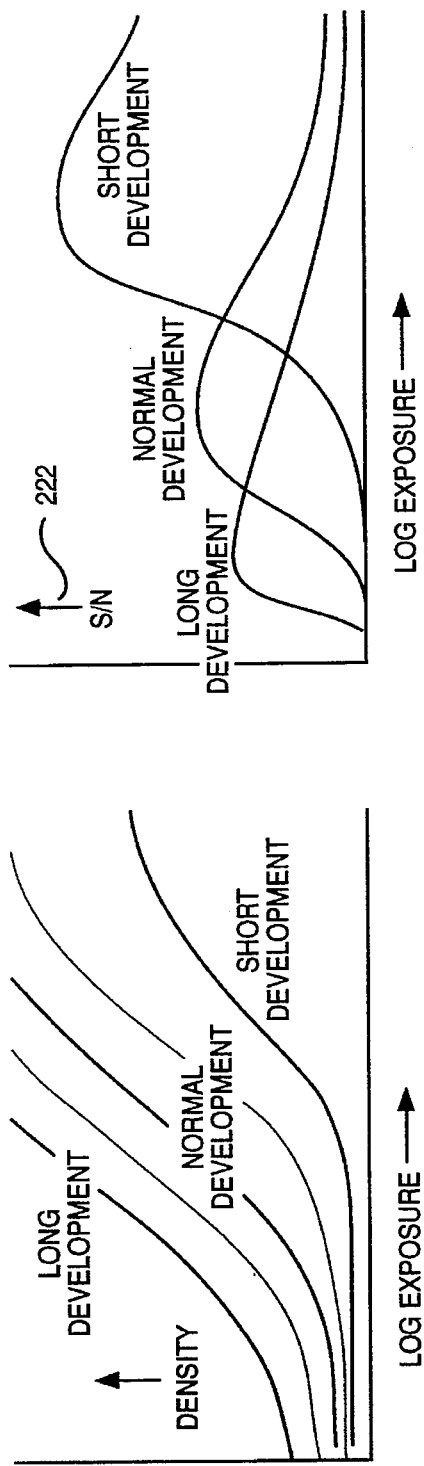
FIG. 2b illustrates the relationship of density/signal to noise ratio and exposure time in a specialized film in accordance with the subject invention.

Building film specifically for this processing allows further improvements. In such a film, the fine grains develop much faster than the coarser grains as in FIG. 2b. This order is actually easy to do, usually the problem is to slow down the finer grains so that they do not get ahead of the larger grains. With such a film, the short development scan gives a fully developed fine grain image with the signal to noise ratio of a normal fine grained film. Continuing to normal development, the faster fine grains in this special film block up the highlights compared to a normal film. The block is acceptable, because the highlights have already been captured in the previous scan. Now another scan is performed to capture the middle tones. By constructing a film in this way, and scanning during development, the wide range, universal nature of a monochrome chromogenic film is realized without the dyes.

Figure 3:
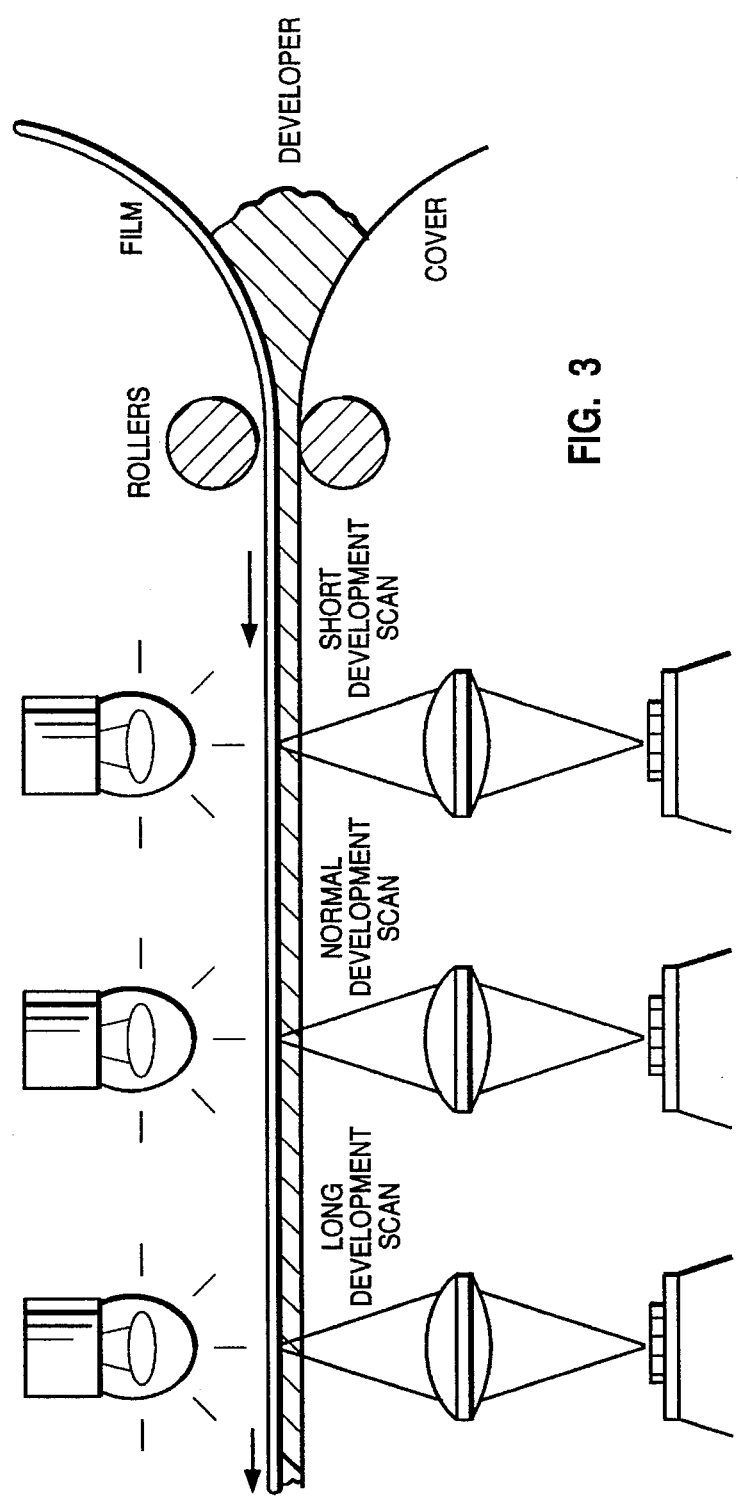
FIG. 3 is an illustration of a film developing system in accordance with the subject invention.

Scanning during development seems a messy process. However, there is a key element that obviates much of the apparent messiness. Only the developer bath is necessary. The stop, fix, clear, wash, wetting agent, and dry are all eliminated. This single bath can be stored in pods and applied as a viscous fluid under a clear cover film with rollers as illustrated in FIG. 3.

ARTIFACT DEFECT CORRECTION

Figure 5B:
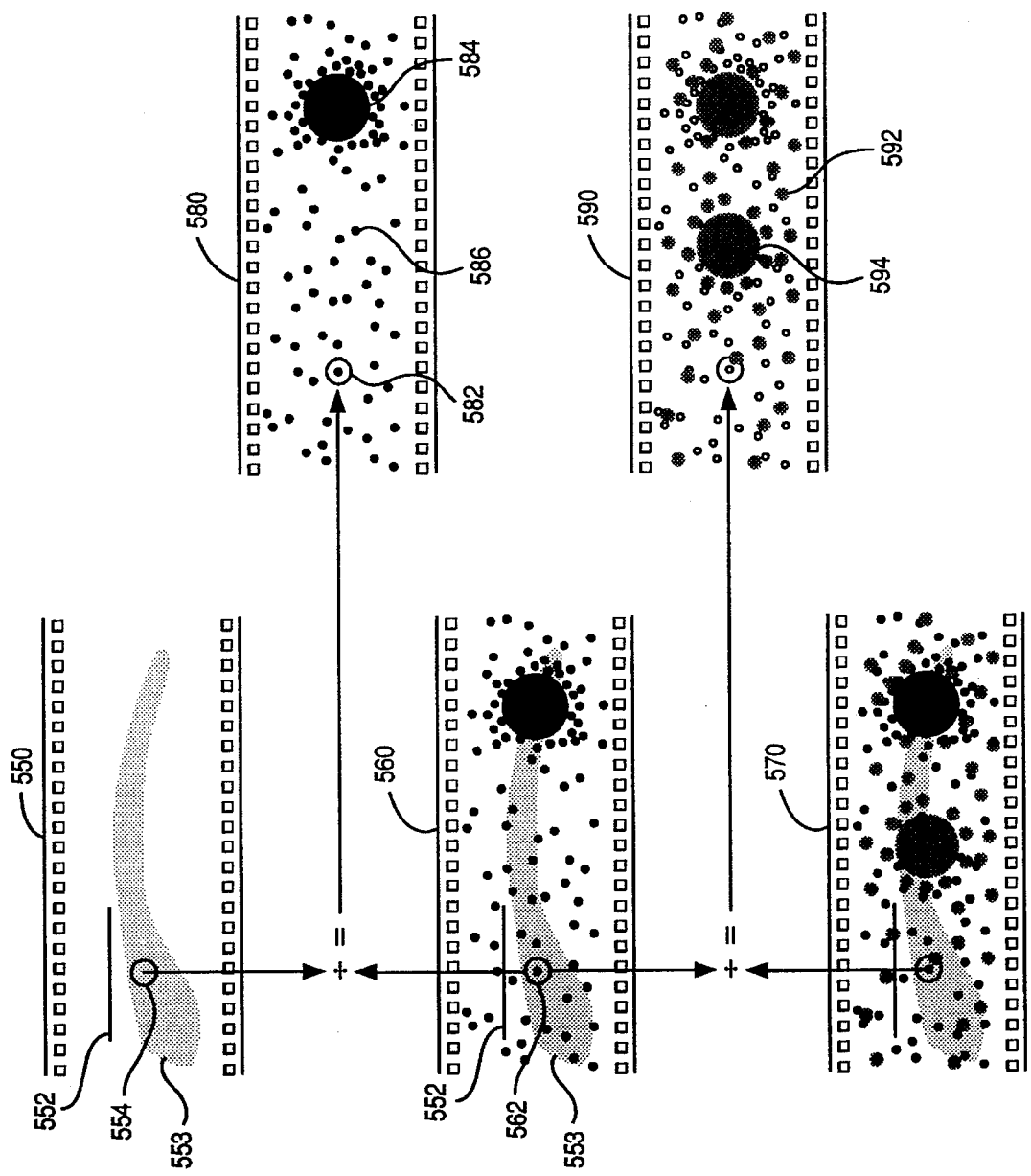
FIG. 5B illustrates defect elimination in accordance with the subject invention.

FIG. 5B is an illustration of the physical film medium as it is scanned to create a digital image in accordance with the subject invention. Defects in the film base, such as scratches or variations in the antihalation dye add undesirable artifacts to the image using the process as heretofore described. A film 550 is scanned at different times during development to produce an undeveloped image 550 before crystals have begun to develop, a partially developed image 560 after the fine grains have developed but before the large grains have begun to develop, and a fully developed image 570 after the large grains have appeared. All images contain the same defects 553 and scratches 552 because they are of the same physical piece of film.

The numerical value representing the light returned from each pixel 562 of the partially developed image 560 is divided by that numerical value of each pixel 554 of the undeveloped image 550 to produce a resulting numerical pixel value 582. This value is combined with the values of the other pixels to produce a finished image 580. In processed image 580, the film defects 553 and scratches 552 appearing in both the undeveloped film image 550 and partially developed film image 560 are cancelled by a division, leaving only the newly developed grains 586 forming light induced shapes 584.

The processing is extended by similarly dividing the pixels of the fully developed image 570 by the pixels of an image 560 made earlier in the development process to reveal the newly developed large grains 592 forming finer light induced shapes 594 free of the film defects 553 and scratches 552, and further, free of interferences from the smaller grains 586 that had already developed in the earlier image 560. The processed images 580 and 590 may be combined using the stitching process described earlier to form a final image with reduced granularity and free of physical film defects. For simplicity, FIG. 5B shows a case employing three scans during development. A larger number can be used to improve the definition, and the illustrative case of three is not intended as a limitation.

DUPLEX FILM SCANNING

Again, the relevancy of electronic film development would diminish if, as in the prior art, this technology excluded color. The next section discusses a technique for extending the processing to color. Duplex film scanning refers to scanning a film with reflected light from both sides of the film and by transmitted light. The scanning is performed on film that is being processed or on film returned to a solution that makes the emulsion opalescent. The system provides a means for developing monochrome or color film with greatly improved detail, recovering greatly improved detail from historical monochrome film, and constructing a greatly improved color film with no dyes.

For years, the applicant used a process called "inspection development". Panchromatic 4×5 inch negatives were first placed in a desensitizing solution so that the development could be viewed under a dim safelight. Developing shadow detail emerged from the emulsion side, but from the base side only the highlight detail emerged. Monochrome films are manufactured with a high speed layer over a low speed, fine grained layer. A stereo microscope reveals the different size of grains at different depths in a finished negative. The opalescence of the unfixed emulsion made it whitish and partially opaque. Backscattering when viewed from the rear made only the back, fine grained layer of the emulsion visible. However, from the front, only the high speed layer was visible. The image could also be viewed by bright, transmitted light to see all layers together.

On one occasion, applicant accidentally developed a color film using the same technique. It was a scene of a cityscape at night with many brightly colored lights. At first, it seemed peculiar that the highlight/shadow separation applicant was used to observing between the front and the back had not developed. Then, applicant noticed that some lights were appearing from the front that did not appear from the back and vice-versa. At that point, applicant detected that color film had accidentally been used. The red and blue silver images were viewed separately before any of the colors had formed. It was then that applicant realized that if a person could view separated color as the film developed, then so could a scanner.

Figure 9:
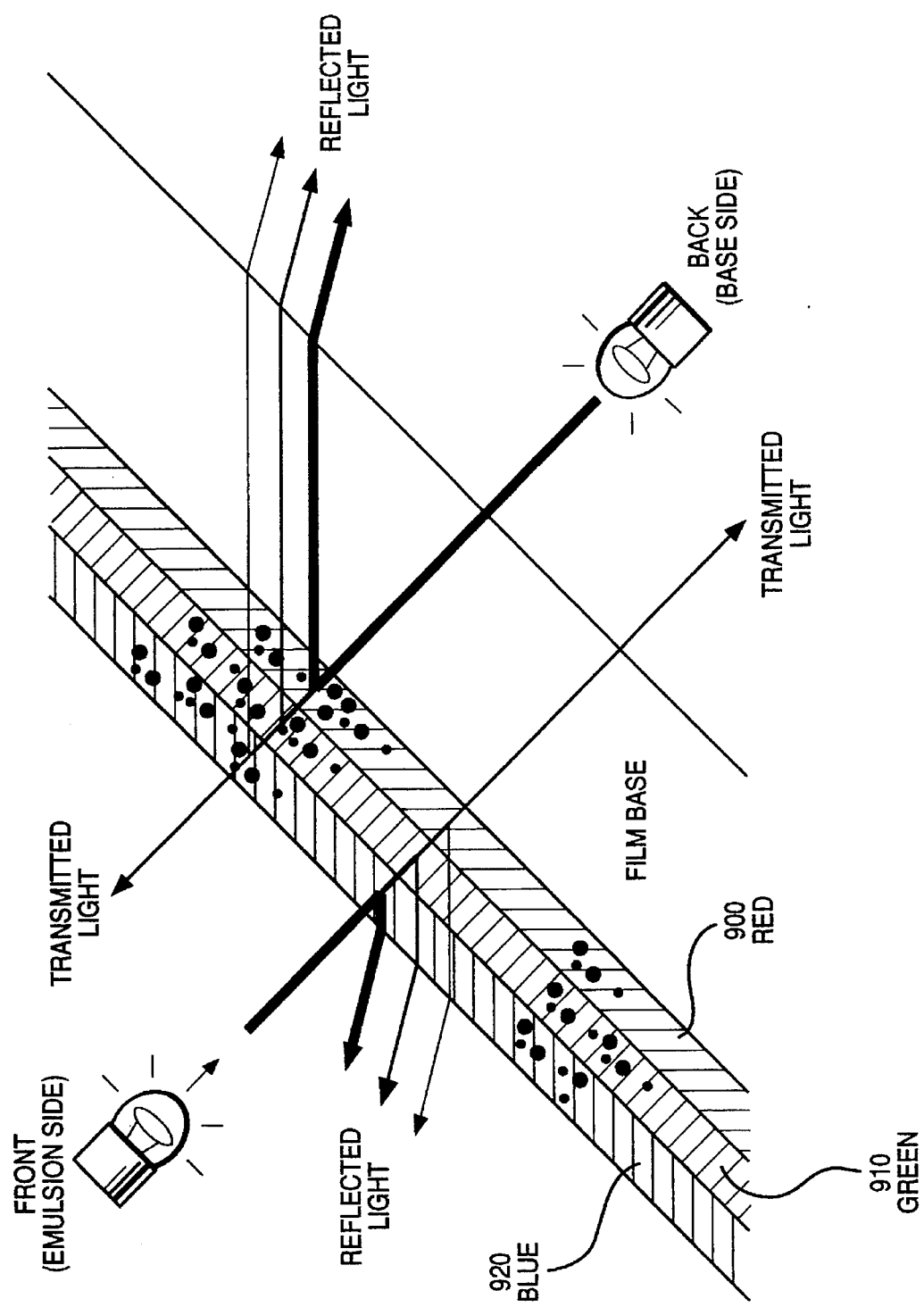
FIG. 9 is an illustration of a duplex film processing system in accordance with the subject invention.

FIG. 9 is an illustration of a duplex film processing system in accordance with the subject invention. In the figure, separate color levels are viewable within a developing film 900 red, 910 green and 920 blue. The film is illustrated greatly enlarged. Over a clear film base are three layers sensitive separately to red, green and blue light. These layers are not physically the colors. Rather, they are sensitive to these colors. In normal color development, the blue sensitive layer would eventually develop a yellow dye, the green sensitive layer a magenta dye, and the red sensitive layer a cyan dye.

During development, these layers are opalescent. Dark grains developing in the top layer 920, the blue source layer, are visible from the front of the film, but are hidden from the rear by the bulk of the opalescent emulsion. Similarly, grains in the bottom layer 900, the red sensitive layer, are visible from the back by reflected light, but not from the front. Grains in the middle layer 910, the green sensitive layer, are mostly hidden by reflected light from the front or the back. However, they are visible along with those in the other layers by transmitted light. By sensing light reflected from the front, the back and light transmitted through the film each pixel in the film yields three measured numbers that may be solved for the three colors. The solution can use the matrix regression such as that illustrated above in FIG. 8.

Although this technique may be applied to standard color film, another option is a film built specifically for this purpose. The film would require no color couplers as a color image never develops. Also, the amount of antihalation response to the infrared of the scanner is balanced so the images are never too dark or too light, and subsequently diffused by the emulsion.

The process may be extended to standard black and white films by practicing the invention to scan the high speed image from the front and the fine grain highlight image from the back. Following the scanning, the stitching process previously described is applied to recover a more grain-free image than would be available from a conventionally developed film. Similarly, the invention may be extended to historical black and white films by returning them to a state of opalescence and scanning from the front and back to reveal separately the high speed and low speed layers.

All prior art technologies suffer from the presumption that films must be printable with an enlarger onto another photochemical receiver such as paper or directly viewed by a human eye. The invention uses a scanner and processing on a computer to replace the prior art method.

While the invention has been described in terms of a preferred embodiment in a specific system environment, those skilled in the art recognize that the invention can be practiced, with modification, in other and different hardware and software environments within the spirit and scope of the appended claims.

Having thus described my invention, what I claim as new, and desire to secure by Letters Patent is:

1. A method for electronically developing an image recorded on a film, the method comprising the steps of:

applying developer to the film to cause an image to be developed on the film;

scanning the film during development at plural spaced time intervals;

storing a digital representation of the image containing a plurality of pixels from each scan of the film; and combining the stored digital representations on a pixel by pixel basis to produce a single output image that differs from any one of the stored digital representations.

2. The method of claim 1, wherein the step of scanning comprises the steps of:

directing a light source toward a first surface of said film; and capturing light reflected from said first surface of said film.

3. The method of claim 2, wherein the step of scanning further comprises the steps of:

directing a second light source toward a second surface of said film, said second surface and said first surface forming opposite sides of said film;

capturing light reflected from said second surface of said film.

4. The method of claim 3, further comprising the step of:

capturing light transmitted through said film.

5. The method of claim 1, wherein the film is scanned three or more times.

6. The method of claim 1, further comprising the step of scanning the film before applying the developer.

7. The method of claim 6, wherein the step of combining the stored digital representations comprises the steps of:

determining a pixel value for each pixel of the image in each of the stored digital representations; and determining an adjusted pixel value for each pixel of the image by dividing the pixel value from the digital representation earlier in time by the pixel value of the digital representation later in time; and repeating the determining an adjusted pixel value step for each of the stored digital representations.

8. The method of claim 6, wherein the step of combining the stored digital representations comprises the steps of:

determining a value for each pixel of the image in each of said two or more scans;

applying a mathematical optimization to said values to determine an optimal pixel value for each of said pixels.

9. A system for electronically developing an image captured on a film, the system comprising:

development means for applying a developing solution to said film;

a first light source for illuminating said film;

a first scanner for digitally capturing light reflected from a same area on said film at two or more spaced time intervals during development to form two or more digital scan images each having a plurality of pixels;

digital image combination means for combining the digital scan images on a pixel by pixel basis to form a single final image that differs from any one of the digital scan images.

10. The system of claim 9, further comprising:

a second light source for illuminating said film, said second light source oriented to scan a surface of said film opposite a surface scanned by said first light source; and a second scanner for digitally capturing light reflected from a same area on said film at two or more spaced time intervals during development to form two or more digital scan images.

11. The system of claim 10, further comprising:

a third scanner for digitally capturing light transmitted through said film at two or more spaced time intervals during development to form two or more digital scan images.

12. The system of claim 9, wherein said digital image combination means comprises:

means for determining a pixel value for each image pixel each of said digital scan images;

means for optimally combining said pixel values to create an output pixel value.

13. The system of claim 12, wherein said means for determining and said means for optimally combing comprise computer logic means.

14. The system of claim 12, wherein said means for optimally combining comprises logic means for applying cube root regression logic to said pixel values.

15. The system of claim 9 wherein said first scanner comprises a plurality of spaced scanners past which the film passes during development.

16. A system for electronically developing a final image digitally scanned at two or more points in time from a film during development using a developing solution, the system operating on a computer system having storage means and processor means, the system comprising:

means for storing said two or more digitally scanned images scanned at spaced time intervals during development in said storage means; and means for determining an optimal value for each pixel in said single final image based upon the pixel values in each of said digitally scanned images.

17. The system of claim 16, wherein said means for determining an optimal value comprises:

means for dividing pixel values for an image earlier in time by corresponding pixel values from an image later in time.

18. The system of claim 16, wherein said means for determining an optimal value comprises:

calculating an optimal pixel value for each image pixel using cube root regression.

19. The system of claim 16 further comprising:

display means for displaying said optimal pixel values to form an optimal output image.

20. The method of claim 1 wherein the step off scanning comprises the steps of:

directing a light source toward said film; and capturing light transmitted through said film.

21. The method of claim 20 wherein the step of combining the stored digital representations comprises the steps of:

determining a pixel value for each pixel of the image in each of the stored digital representations; and determining an adjusted pixel value for each pixel of the image by dividing the pixel value from the digital representation earlier in time by the pixel value of the digital representation later in time; and repeating the determining and adjusted pixel value step for each of the stored digital representations.

22. The method of claim 20, wherein the steps of combining the stored digital representations comprises the steps of:

determining a value for each pixel of the image in each of said two or more scans; and applying a mathematical optimization to said values to determine an optimal pixel value for each of said pixels.

23. A system for electronically developing an image captured on a film, the system comprising:

development means for applying a developing solution to said film;

a light source for illuminating said film;

a scanner for digitally capturing light transmitted through said film at two or more spaced time intervals during development to form two or more digital scan images; and digital image combination means for combining the digital scanned images on a pixel by pixel basis to form a single final image that differs from any one of said digital scan images.

24. The system of claim 23, wherein said digital image combination means comprises:

means for determining a pixel value for each image pixel of said digital scan images; and means for optimally combining said pixel values to create an output pixel value.

25. The system of claim 24, wherein said means for determining said means for optimally combining comprises computer logic means.

26. The system of claim 25, wherein said means for optimally combining comprises logical means for applying cube root regression logic to said pixel value.

27. The system of claim 23, wherein said scanner comprises a plurality of spaced scanners past which the film passes during development.

* * * * *